No. 764,444. PATENTED JULY 5, 1904.
R. FINKELSON.
COMPASS AND LEVEL ATTACHMENT FOR VEHICLES.
APPLICATION FILED JUNE 13, 1903.
NO MODEL.
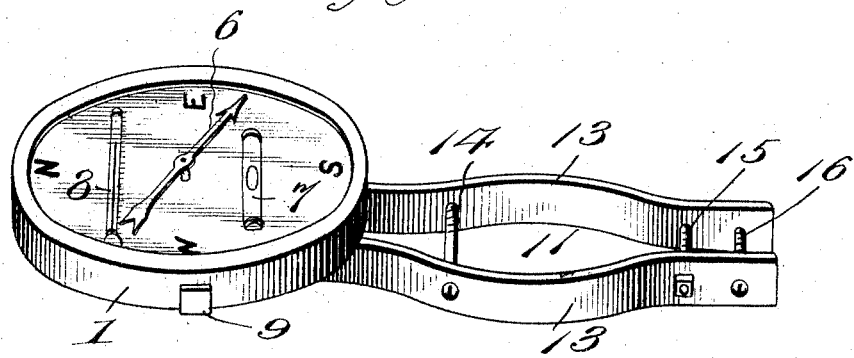
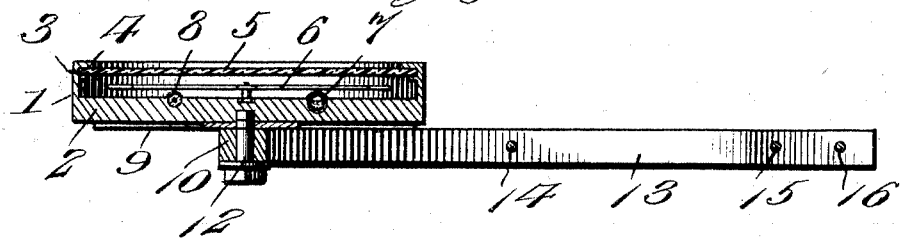
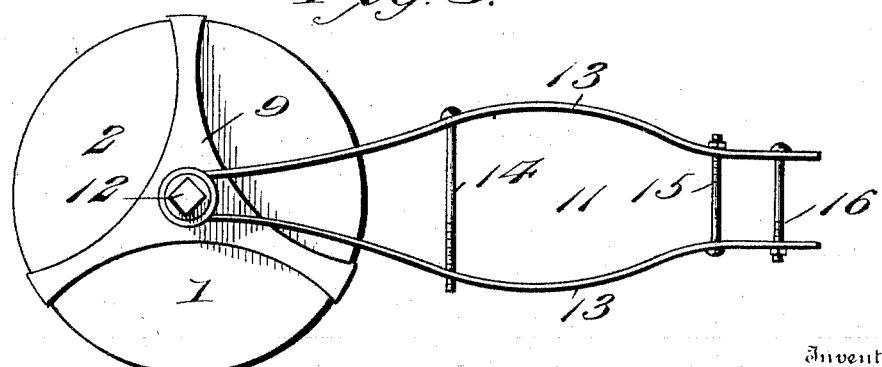
Witnesses
Inventor
Raymond Finkelson,
By Victor J. Evans
Attorney No. 764,444. Patented July 5, 1904.

UNITED STATES PATENT OFFICE.

RAYMOND FINKELSON, OF BROOKLYN, NEW YORK.

COMPASS AND LEVEL ATTACHMENT FOR VEHICLES.

SPECIFICATION forming part of Letters Patent No. 764,444, dated July 5, 1904.

Application filed June 13, 1903. Serial No. 161,384. (No model.)

*To all whom it may concern:*

Be it known that I, RAYMOND FINKELSON, a citizen of the United States, residing at Brooklyn, in the county of Kings and State of New York, have invented new and useful Improvements in Compass and Level Attachments for Vehicles, of which the following is a specification.

This invention relates to a compass and level attachment for bicycles, automobiles, and the like; and the primary object of the attachment is to inform the rider of a bicycle or operator of an automobile as to the direction in which he is traveling or whether he is on a level or moving up or down grade.

The improved attachment is adapted to be attached to the handle-bars of a bicycle or to parts of the frame adjacent to the handle-bars and is disposed in a horizontal position, so as to be readily seen and inform the rider as to the direction of movement or grade. It is also applied, preferably, on the dashboard of an automobile, though it may be attached to any other part of the latter where it can be readily viewed.

The invention consists in the construction and arrangement of the several parts, which will be more fully hereinafter described and claimed.

In the drawings, Figure 1 is a perspective view of a compass and level attachment embodying the features of the invention. Fig. 2 is a vertical longitudinal section of the same. Fig. 3 is a bottom plan view thereof.

Similar numerals of reference are employed to indicate corresponding parts in the several views.

The numeral 1 designates a case or box having a base 2 and a surrounding flange 3, rising from the base, having an inner seat 4 at the upper terminal to receive a glass or other transparent cover-plate 5. The base 2 has its upper surface prepared or arranged to define the four cardinal points of a compass—namely, north, south, east, and west—and in the center is a magnetic needle 6, which operates, as usual, in connection with said points. In the base 2 a level 7 is mounted and may be of any of the preferred forms of such devices, said level being depressed within the base to such an extent as to avoid interfering with the needle 6 in its free rotation. The base 2 also carries a thermometer 8, by means of which a rider or operator may ascertain the temperature at a glance. The case or box is embraced by a support or spider 9, having in the present instance three arms with the terminals upturned against the periphery of the case or box. Disposed against the center of the support or spider is a head 10 of a clamp 11, the said head 10 being firmly held in applied position by a screw-bolt 12, which projects upwardly into the center of the base, as clearly shown by Fig. 2. The clamp 11 comprises opposite yielding arms 13, which are slightly bowed at the center for embracing a part of the handle-bars or frame of a bicycle or a portion of the dashboard or guard of an automobile or like vehicle. The arms 13 are connected by a brace-screw 14, and at their rear terminals are clamping-screws 15 and 16, the said screws being employed to firmly secure the arms to a part of the bicycle or automobile to which the improved attachment is applied.

When the attachment is applied, it is disposed in horizontal position and the rider or operator can readily ascertain therefrom the direction in which he is traveling or whether he is moving on a level or up or down grade.

The improved attachment will be found exceptionally convenient, and to accommodate different applications changes in the proportions and dimensions may be resorted to without departing from the spirit of the invention.

Having thus fully described the invention, what is claimed as new is—

A device for attachment to a support therefor, as some part of a bicycle or other vehicle, consisting of an inclosing case holding a compass and spirit-level, and an embracing spider for the case having arms secured against the periphery of the latter, and a clamp provided with a head at its front terminal removably secured against the center of the under side of the spider and case-bottom, the said clamp having arms extending rearwardly therefrom and formed with intermediate outwardly-directed bows and rear straight ends, the arms having a brace-screw extending therethrough in advance of the maximum projection of the bows and clamping-screws engaging the rear straight ends thereof.

RAYMOND FINKELSON.

Witnesses:
PHILIP HAUSER,
WILLIAM KNOOP.